United States Patent [19]
Corkhill

[11] 4,068,210
[45] Jan. 10, 1978

[54] SEISMIC VIBRATOR PHASE DETECTOR

[75] Inventor: David P. Corkhill, St. Albans, England

[73] Assignee: Standard Oil Company (Indiana), Chicago, Ill.

[21] Appl. No.: 674,699

[22] Filed: Apr. 7, 1976

[51] Int. Cl.² .............................................. G01V 1/16
[52] U.S. Cl. .................................. 340/17 R; 181/121;
 181/401; 324/83 D; 324/83 FE
[58] Field of Search .................. 340/17; 181/401, 121;
 324/83 D, 83 FE

[56] References Cited
U.S. PATENT DOCUMENTS 3,626,267 12/1971 Bobbitt
3,698,508 10/1972 Landrum, Jr.

OTHER PUBLICATIONS

Balodis, M. "Laboratory Comparison of Tanlock and Phase-Lock Receiver", *Proc. Nat. Telem Conf.* Paper 5-4, 1964, pp. 1-11.

*Primary Examiner*—Harvey E. Behrend
*Attorney, Agent, or Firm*—Albert C. Metrailer; Arthur McIlroy

[57] ABSTRACT

A phase detector for detecting the phase difference between a pilot reference signal and a feedback signal generated by movement of a vibrator baseplate. The detector includes a phase shifter for providing a delayed reference signal phase-shifted from the pilot reference signal by 90°. A pair of multiplier circuits generate the products of the pilot reference signal times the feedback signal and the delayed reference signal times the feedback signal. A pair of integrators integrate the multiplier outputs over one full cycle of pilot reference signal. A divider generates the quotient of the integrator outputs at the end of each integration cycle. This quotient is proportional to the tangent of the phase difference between the pilot reference signal and the fundamental frequency component of the feedback signal. An arctangent decoder circuit converts the divider output to the actual phase-angle difference. This phase difference information is then used to shift the phase of the input to the vibrator to cause the vibrator baseplate to move in phase with the pilot reference signal.

9 Claims, 2 Drawing Figures

SEISMIC VIBRATOR PHASE DETECTOR

BACKGROUND OF THE INVENTION

This invention relates to phase-locking servo-hydraulic vibrator control systems, and more particularly to a phase detector for a vibrator control system.

In seismic geophysical surveying, utilizing a servo-control vibrator as a source of seismic waves, the need for maintaining a constant phase relationship between the reference or pilot signal and the output signal of the vibrator transmitted into the ground is well established. This phase-locking of the seismic waves to the reference signal is especially important at lower frequencies and when a plurality of vibrators are used simultaneously. In any case, the vibrator must be phase-locked to the reference signal if the desired acoustic wave is to be transmitted into the earth.

One form of vibrator controller is disclosed in U.S. Pat. No. 3,698,508, issued to R. A. Landrum, Jr., on Oct. 17, 1972. In this system, a signal derived from an accelerometer attached to a vibrator baseplate is phase-compared by means of an analog multiplier with a reference signal. The analog multiplier output is used to adjust the phase shift of the signal actually applied to the vibrator to thereby bring the vibrator baseplate into phase-lock with the reference signal. A first problem which occurs in all vibrator control systems is that the output of the accelerometer has an amplitude which varies with the driving frequency. This amplitude modulation passes through the multiplier and modulates the multiplier error signal output when it is desired that only phase changes cause error signal changes. The solution for this problem, as illustrated in the Landrum patent, is to pass the accelerometer output signal through an automatic gain control amplifier before coupling it to the phase detecting multiplier. The automatic gain control amplifier does improve the operation of this type of system, but, as recognized in the Landrum patent, the accelerometer output signal also contains substantial harmonic signals which, quite often, have amplitudes greater than the fundamental signal. These large harmonics interfere with the automatic gain control amplifier and result in suppression of the fundamental frequency signals to a level below that which is desired. In the Landrum patent, this harmonic interference problem is alleviated by introducing a tracking filter in the signal path from the accelerometer to the AGC amplifier. The tracking filter is a low pass filter with a variable cutoff point which is controlled in response to the reference signal to remove harmonics from the accelerometer output signal.

A second basic type of vibrator-control system is illustrated by the disclosure of U.S. Pat. No. 3,626,267, issued to J. T. Bobbitt, on Dec. 7, 1971. The Bobbitt patent illustrates a basically digital vibrator control system in which variable phase shifting is accomplished by changing the point at which a vibrator control signal is taken from a shift register. The phase detector of this control system is also digital and comprises basically a pair of zero crossing detectors and logic circuitry for generating pulses whose widths correspond to the time between zero crossings of the reference signal and the accelerator feedback signal. In the Bobbitt system, an automatic gain control amplifier is included to reduce the amplitude modulation normally present in the accelerator feedback signal. The system is still subject to interference from harmonics which can cause suppression of the fundamental signal in the automatic gain control amplifier. Of more importance in this type of phase detector is the fact that the harmonics shift the zero crossings of the feedback signal from the time at which they would occur if only the fundamental were present.

Thus, it is seen that in presently known control systems for vibrators the phase detectors are sensitive to amplitude modulation and harmonic distortion in the accelerometer feedback signal. Useful systems must include an automatic gain control amplifier and often a tracking filter to compensate for the amplitude modulation and harmonic content of typical accelerometer feedback signals.

Accordingly, an object of the present invention is to provide an improved phase detector for a servo-hydraulic vibrator.

Another object of the present invention is to provide a phase detector which detects the phase relation of a reference signal and the fundamental frequency component of a feedback signal which contains substantial harmonic components.

SUMMARY OF THE INVENTION

A phase detector, according to the present invention, comprises a 90° phase delay unit, a pair of multipliers, a pair of integrators, and a divider. The delay unit receives a pilot, or reference, signal and generates a delayed reference signal phase shifted by 90° with respect to the pilot. The pilot signal and the delayed reference signal are coupled to one input each of the two multipliers. A second input of each multiplier receives a vibrator baseplate feedback signal. The output of each multiplier is coupled to the output of an integrator which integrates the multiplier outputs over one full cycle of the pilot signal. The two integrator outputs are coupled to two inputs of the divider which generates the quotient of the two integrator outputs at the end of one full cycle of pilot signal. The divider output is then proportional to the tangent of the phase difference between the reference signal and the fundamental frequency component of the baseplate feedback signal.

BRIEF DESCRIPTION OF THE DRAWINGS

The present invention will be more fully understood by reading the following description of the preferred embodiment with reference to the accompanying drawings, wherein.

DESCRIPTION OF THE PREFERRED EMBODIMENT

Figure 1:
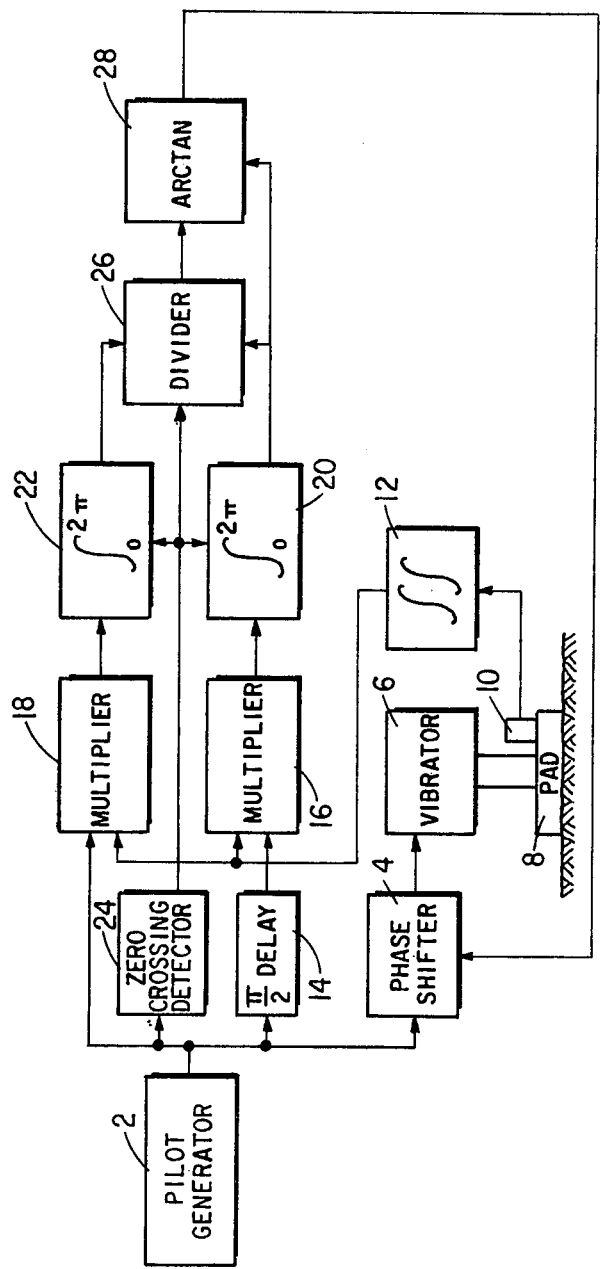
FIG. 1 is a general block diagram of a servo-hydraulic vibrator and its control system, including a phase detector according to the present invention.

FIG. 1 illustrates, in general block diagram form, a servo-hydraulic vibrator and a control system having a phase detector according to the present invention. A pilot signal generator 2 generates a desired seismic signal which may be, for example, a sine wave varying in frequency from 10 to 90 hertz over a period of from 6 to 10 seconds. The output of pilot generator 2 is coupled through a phase shifter 4 to a vibrator 6 which mechanically vibrates a pad 8 which is in contact with the earth's surface. An accelerometer 10 is mounted on pad 8 to provide a feedback indication of pad motion. The output of accelermeter 10 is coupled to the input of a double integrator 12 which converts the acceleration signal from accelerometer 10 to an indication of pad position.

The output of pilot generator 2 is also coupled to a 90° delay unit 14 which generates an output identical to the input but delayed by 90° in phase. The output of phase delay unit 14 is coupled to one input of a multiplier 16 and the output of double integrator 12 is coupled to the second input of multiplier 16. The output of pilot generator 2 is also coupled to one input of a second multiplier 18 and the output of double integrator 12 is coupled to the second input of multiplier 18. The outputs of multipliers 16 and 18 are coupled to the inputs of a pair of integrators 20 and 22, respectively. The output of pilot generator 2 is coupled to the input of a zero-crossing detector 24, which generates an output signal at the end of each full cycle of pilot output signal from generator 2. The output of zero-crossing detector 24 is coupled to a pair of second inputs to integrators 20 and 22 to cause the integrators to reset to zero at the end of each cycle of integration. Integrators 20 and 22 have outputs coupled to two inputs of a divider 26 which also receives the output of zero-crossing detector 24. The output of divider 26 is the quotient of the two input signals received from integrators 20 and 22 at the time the last signal was received from zero-crossing detector 24. The outputs of divider 26 and integrator 20 are coupled to the input of an arctangent decoder 28 which generates an output proportional to the angle whose tangent equals the signal received from divider 26. The output of one of the integrators 20 or 22 is required by decoder 28 only if it is a four-quadrant decoder; that is, if it is to function for phase angles greater than ±90°. The output of arctangent decoder 28 is proportional to the phase angle between the output of pilot generator 2 and the fundamental frequency component of the output of double integrator 12. This output of arctangent decoder 28 is also the error signal which is coupled back to phase shifter 4 to shift the phase of the signal coupled to vibrator 6 in the proper direction to reduce the phase difference between the output of pilot generator 2 and the actual motion of pad 8.

The operation of the control system of FIG. 1 can be best understood by a mathematical description of the signals generated within the system. The output of pilot generator 2 is typically a fixed-amplitude sine wave varying in frequency from 10 to 100 hertz over a 6- to 10-second period. The motion of pad 8, and therefore the signal output from integrator 12, generally follows this pilot signal but with some phase difference, amplitude changes, and with substantial harmonics. The product of these two signals is generated by multiplier 18 and is essentially the same as that produced in prior-art systems. The output of multiplier 18 contains a component equal to one-half the product of the amplitudes of the pilot signal from generator 2 and the feedback signal received from integrator 12 times the cosine of the phase angle between the two input signals. The output of multiplier 18 additionally includes some double frequency components and some components, which may be substantial, generated by the harmonic components of the feedback signal from integrator 12. When the output of multiplier 18 is integrated over one full cycle by integrator 22, the double frequency components and the signal components generated by the harmonics are essentially removed so that the output of integrator 22 is simply equal to one-half the product of the amplitudes of the pilot signal and the feedback-signal fundamental frequency component times the cosine of the phase difference between them.

The phase delay unit 14 receives the pilot output from generator 2 and generates a second phase-shifted reference signal which may be termed a quadrature reference because it is shifted 90° with respect to the pilot reference signal from generator 2. The result of this phase shift is that if the pilot signal is represented as A cos $\omega$ then the quadrature reference is equal to A sin $\omega$T. The multiplier 16 and integrator 20 operate upon the quadrature reference signal and the feedback signal from integrator 12 in the same way that multiplier 18 and integrator 22 operates upon the pilot reference signal and the feedback signal from integrator 12. Since the quadrature signal is 90° phase-shifted from the pilot reference signal, the output of integrator 20 is equal to minus one-half the product of the amplitudes of the quadrature reference signal and the feedback signal times the sine of the phase difference between the pilot reference signal and the feedback signal. Since phase delay unit 14 causes only a phase shift and no amplitude change, the outputs of integrators 20 and 22 have the same amplitude factors and differ only in containing the sine and cosine, respectively, of the phase difference which is being detected. The result is that when divider 26 generates the quotient of the two input signals at the end of each cycle, the output is equal to the tangent of the phase difference between the pilot signal and the feedback signal, and the amplitude factors cancel out to unity. This tangent signal is coupled to the arctangent decoder 28 which generates an output proportional to the actual phase difference between the pilot signal and the feedback signal. This phase difference is the error signal which is coupled to phase shifter 4 to adjust the phase of the electrical input to vibrator 6 to cause the motion of pad 8 to phase-lock with the pilot reference signal from generator 2.

Some small errors in the outputs of integrators 20 and 22 and divider 26 and arctan 28 can be expected. These errors are mostly caused by changes in phase between the output of double integrator 12 and the reference and delayed reference signals during the measurement cycle. One source of these phase changes in the inherent phase shifting in this type of swept frequency system, which the phase detector of the present invention is intended to correct. Another source of a phase change during a measurement cycle is the phase shifter 4 which makes a correction based on the immediately preceding measurement during the following measurement. This source of calculation error could be eliminated by adding circuitry which would prevent initiation of a new measurement cycle until the previous phase measurement has been fed back to phase shifter 4 and has been effectively coupled to vibrator 6. This could be done by making zero crossing detector 24 more complex so that it resets integrators 20 and 22 to zero alternately after two and then one zero crossings are detected, but only activates divider 26 at the end of the two-crossing period. In this way, a measurement could be made during the first two half cycles and the correction during the third. Due to the added complexity of this circuitry and the fact that it reduces the number of corrections which can be made during an initiation, it was not included in the preferred embodiment.

It is apparent that in some systems it is allowable and possibly desirable to use the output of divider 26 as the error signal which is coupled back to phase shifter 4 to phase-lock the vibrator pad motion with the pivot generator signal. This is true because for small angles the value of the tangent function approximates the value of the angle in radians both in amplitude and in sign. The sign of the tangent function remains correct for angles up to ±90°, while the amplitude is nonlinear and approaches infinity and thus is analogous to having higher gain in the feedback loop for large phase errors.

Figure 2:
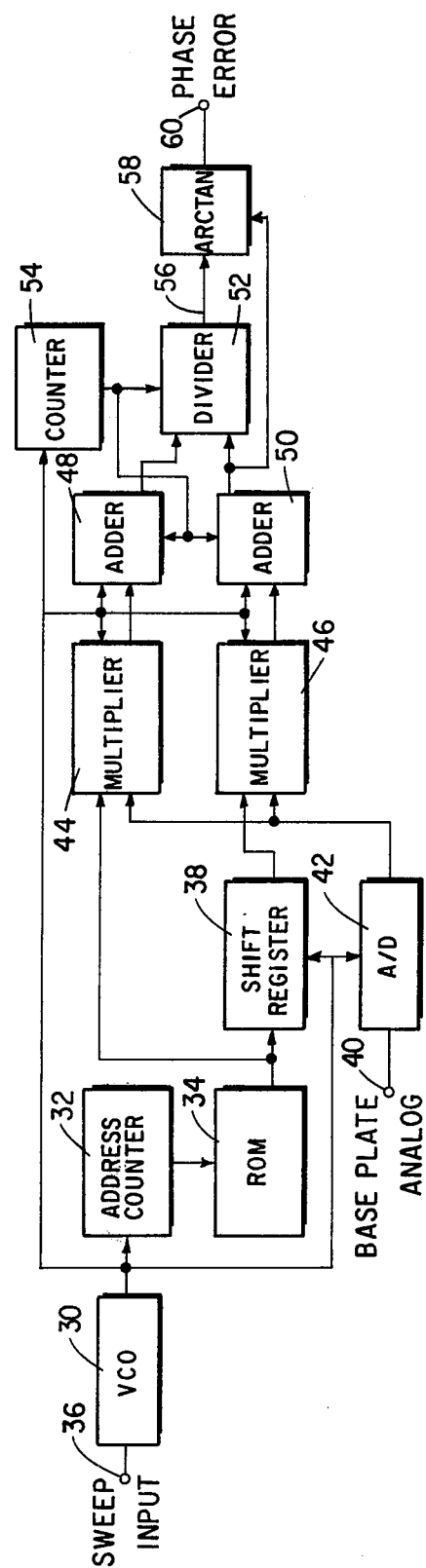
FIG. 2 is a more detailed block diagram of a phase detector according to the present invention implemented in digital electronics.

FIG. 2 illustrates the preferred embodiment phase detector which is implemented in digital electronics. The digital form is preferred because of the difficulty in performing the necessary operations with analog devices at the low frequencies normally encountered in seismic work. In FIG. 2, the function of pilot generator 2 of FIG. 1 is performed by a voltage-controlled oscillator, VCO, 30, an address counter 32, and a read only memory, ROM, 34. The VCO 30 has an input 36 for receiving a sweep input, which, for the typical seismic varying frequency signal, is a linear voltage ramp. The output of VCO 30 is a series of pulses having a repetition rate controlled by the instantaneous potential at input 36. The output of VCO 30 is coupled to an address counter 32, which counts or sequentially adds the pulses and thereby provides an output which sequentially addresses the ROM 34. In the preferred embodiment, ROM 34 contains 128 addresses with each address storing a digitized sample of a sine wave. The address counter 32 is therefore designed to reset itself to zero each time that it counts 128 pulses, and the actual pilot frequency is equal to the frequency of the VCO 30 divided by 128.

The output of ROM 34 is coupled to the input of a shift register 38 which performs the function of the 90° phase delay unit 14 of FIG. 1. Shift register 38 has 32 stages and receives the output of VCO 30 as a clock input. Since 128 clock pulses are required to generate one full cycle of pilot signals from ROM 34, the 32-stage delay generated in shift register 38 is always a 90° phase shift, regardless of the output frequency of VCO 30.

A baseplate feedback signal, such as the output of double integrator 12 of FIG. 1, is coupled to an input 40 of an analog-to-digital converter, A/D, 42. The A/D 42 also receives the output of VCO 30 as a trigger input and provides a digitized sample of the analog input signal each time a trigger pulse is received.

A digital multiplier 44 receives the output of ROM 34 and the output of A/D 42. Multiplier 44 also receives the output of VCO 30 as a trigger pulse and provides an output equal to the product of the two signal inputs each time a trigger pulse is received. A second multiplier 46 likewise receives the outputs of shift register 38 and A/D 42 and generates the product of these two signals each time a trigger pulse is received from VCO 30. A pair of adders 48 and 50 receive the outputs of multipliers 44 and 46, respectively. The adders 48 and 50 also receive the output of VCO 30 as a trigger input and add or accumulate the most recent multiplier outputs to a previously accumulated total each time that a trigger pulse is received. The outputs of adders 48 and 50 are coupled to the inputs of a divider 52, which generates the quotient of these two inputs. A counter 54 receives the output pulses from VCO 30 and generates an output pulse each time one full cycle of pilot reference signal has been completed. Counter 54 is therefore simply a divided-by-128 counter. The output of counter 54 is coupled to adders 48 and 50 to cause them to reset to zero at the end of each full cycle of pilot signal. The output of counter 54 is also coupled to divider 52 to cause it to provide the quotient of the two input sums on its output line 56 at the end of each full cycle of pilot signal. The signal on output line 56 therefore changes only one each full phase measurement cycle and is coupled to an input of an arctangent decoder 58. Decoder 58 also receives the sign bit of the output of adder 50 to allow it to operate at phase angles beyond ±90°. Decoder 58 generates an output which is proportional to the phase difference between the pilot reference output of ROM 34 and the feedback signal received in input 40. The output of decoder 58 is coupled to a phase-error output 60. Since this phase-error output is in digital form in this preferred embodiment, it is well suited for coupling to a digital phase shift unit, such as that disclosed in the above-referenced U.S. Pat. No. 3,626,267.

In operation, the preferred embodiment of FIG. 2 performs the same mathematical functions as those described with respect to FIG. 1. As described above, a varying frequency sine wave reference signal is produced by VCO 30, address counter 32, and ROM 34, in the form of a series of digital words. Shift register 38 generates a delayed reference signal. An analog feedback signal is digitized by A/D 42 to provide a feedback digital word for each reference word. Multipliers 44 and 46 generate products of the reference times feedback words and the delayed reference times feedback words, respectively. Adders 48 and 50 sequentially sum the products generated by multipliers 44 and 46. Adders 48 and 50 thereby perform the function of integrators 22 and 20 of FIG. 1. After 128 pulses have been generated by VCO 30, the reference has completed one full cycle and the outputs of adders 48 and 50 are digital representations of one-half the product of the amplitudes of the reference and feedback signals times the cosine and sine, respectively, of the phase difference between the reference and feedback signals. At this point, counter 54 triggers divider 52 to cause it to generate the quotient of the output of adder 50 divided by the output of adder 48. Counter 54 also causes adders 48 and 50 to reset to zero to start the next integration cycle. The output 56 of divider 52 and the output of adder 50 are coupled to arctangent decoder 58. With these two inputs, decoder 58 is able to provide a phase-error output for phase angles up to ±180°.

As discussed above, it may be desirable in some systems to inhibit the beginning of a new measurement or integration cycle while a phase correction based on an immediately preceding measurement is being made. In this digital embodiment, this change can be made more simply and without waiting a full half cycle of the reference signal. For example, if it is known that a correction can be completed within one-eighth of a cycle, a 16-bit counter can be used to stop measurement for one-eighth of a cycle after each measurement is made. This additional counter would start counting the outputs of VCO 30 when counter 54 puts out its reset pulse. At the end of its 16-count period, it would put out a reset pulse to adders 48 and 50 and to counter 54 to reset them to zero again. This counter would then be inhibited from counting again until a new pulse is received from counter 54. In this way, an error measurement could be made for one full cycle starting on one and one-eighth cycle spacings. This additional circuitry was not included in the preferred embodiment for simplicity and to obtain the largest number of corrections possible during each initiation.

The arctangent decoder 58 may be, for example, a digital "look-up" table, or ROM, similar to ROM 34. In this type of digital memory, the input signal is used to address the memory and corresponding angles are permanently stored in the memory at the appropriate addresses. An alternate analog form of an arctangent decoder may be found at page 119, of the text of *Nonlinear Circuits Handbook*, published by Analog Devices, Inc., P.O. Box 796, Norwood, Massachusetts 02062, from whom copies may be ordered. This analog version performs the function of divider 52 in addition to the decoder function, but requires a pair of analog-to-digital converters to interface with the FIG. 2 embodiment.

It is apparent that the digital phase detector of FIG. 2 may be constructed from a wide variety of presently available digital integrated circuit components. An example of the implementation of most of the arithmetic components illustrated in FIG. 2 may be found in an RCA Corporation application note ICAN-6600, published at page 427, of the 1974 RCA Solid State Data Book No. SSD-203B. All of the arithmetic operations of FIG. 2 may also be performed by the circuitry of presently available pocket calculator integrated circuits which may be adapted to this type of automatic single purpose use.

Although the present invention has been illustrated in terms of a specific embodiment, it is apparent that other changes and modifications may be made within the scope of the present invention, as defined by the appended claims.

I claim:

1. A phase detector for detecting the phase of a driven apparatus relative to the phase of an electrical pilot signal comprising the combination of:
   delay means for receiving said pilot signal and providing an output signal having a 90° phase shift relative to said input,
   a motion detector coupled to said driven apparatus for providing an electrical output proportional to the physical movement of said apparatus,
   a first amplifier coupled to said motion detector and said pilot signal for providing an output proportional to the product of said pilot signal and the motion detector output,
   a second multiplier coupled to said motion detector and to said delay means for providing an output proportional to the product of said delay means output and the motion detector output,
   first and second integrators coupled to said first and second multipliers, respectively, and to said pilot signal for integrating the outputs of said multipliers during one full cycle of the pilot signal and for providing outputs proportional to the integrals of said multiplier outputs, and
   a divider coupled to said integrators and to said input signal for providing an output proportional to the quotient of the integrals after one full cycle of input signal.

2. A phase detector according to claim 1 further including,
   arctangent decoding means coupled to said divider for providing an output proportional to the angle whose tangent is equal to the output of said divider, whereby said decoding means output is proportional to the phase difference between said input signal and the motion detector output.

3. A phase detector according to claim 2 wherein said arctangent decoding means is also coupled to one of said integrators whereby said decoder may function for phase angles greater than ±90°.

4. In a system for maintaining substantially constant the phase relation between varying frequency seismic signals induced in the earth by a servo-hydraulic vibrator and a reference signal controlling said vibrator, wherein a feedback signal representing said induced signals is phase-compared with said reference signal in a phase-comparing means which produces an error signal, and said error signal is used to produce a compensating phase shift of said reference signal tending to minimize the amplitude of said error signal,
   improved phase-comparing means comprising:
   delay means for receiving said reference signal and providing an output signal having a 90° phase shift relative to said reference,
   a first multiplier having inputs for receiving said reference signal and said feedback signal and an output for providing a signal proportional to the product of said reference signal and said feedback signal,
   a second multiplier having inputs for receiving the output of said delay means and said feedback signal and an output for providing a signal proportional to the product of said delay means output signal and said feedback signal,
   first and second integrators coupled to said first and second multiplier outputs, respectively, and to said reference signal for integrating the output signals of said multipliers during one full cycle of the reference signal, said integrators having outputs for providing signals proportional to the integrals of said multiplier output signals, and
   a divider coupled to said first and second integrator outputs and to said reference signal for providing an output proportional to the quotient of the integrals after one full cycle of reference signal.

5. Improved phase-comparing means according to claim 4 further including:
   arctangent decoding means coupled to said divider for providing an output proportional to the angle whose tangent is equal to the output of said divider, whereby said decoding means output is proportional to the phase difference between said reference and said feedback signals.

6. Improved phase-comparing means according to claim 5 wherein said arctangent decoding means is also coupled to one of said integrators, whereby said decoder may function for phase angles greater than ±90°.

7. In a system for maintaining a substantially constant-phase relation between varying frequency seismic signals induced in the earth by a servo-hydraulic vibrator and a reference signal controlling said vibrator, wherein said reference signal is a sequence of digital words which are coupled to the vibrator through a digital phase shifter, a feedback signal representing said induced signals is digitized to provide a feedback word for each reference word, a sequence of said reference and feedback words are coupled to a phase-comparing means which produces an error signal and said error signal is coupled to the phase shifter to produce a compensating phase shift of the reference signal tending to minimize the amplitude of the error signal, improved phase-comparing means comprising:
   digital delay means having an input for receiving said reference signal and an output for providing the same sequence of digital words as said reference signal, delayed by one-fourth of the period of one full cycle of reference signal, a first digital multiplier having a first input for receiving said reference signal digital words and a second input for receiving said digitized feedback words, and an output for providing the digital product of each pair of input words, a second digital multiplier having a first input for receiving digital words from said delay means and a second input for receiving said reference signal digital words and an output for providing the digital product of each pair of input words, first and second digital adders, each having an input coupled to said first and second multiplier outputs, respectively, for sequentially adding each product generated by said multipliers for one full cycle of said reference signal, and a divider coupled to said first and second adders for providing an output equal to the quotient of the sums generated by said adders over one full cycle of reference signal.

8. Improved phase-comparing means according to claim 7 further including:

arctangent decoding means coupled to the divider having an output for providing an error signal proportional to the angle whose tangent is equal to the output of said divider.

9. Improved phase-comparing means according to claim 8 wherein said arctangent decoder means is also coupled to one of said adders, whereby said decoder may function for phase angles greater than ±90°.

* * * * *

UNITED STATES PATENT OFFICE
CERTIFICATE OF CORRECTION

PATENT NO. : 4,068,210
DATED : January 10, 1978
INVENTOR(S) : David P. Corkhill

It is certified that error appears in the above-identified patent and that said Letters Patent are hereby corrected as shown below:

Column 2, line 34, "output" should read --input--.

Claim 1, column 7, line 41, "amplifier" should read --multiplier--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks